(12) United States Patent
Gagnon

(10) Patent No.: US 6,241,321 B1
(45) Date of Patent: Jun. 5, 2001

(54) ALL TERRAIN WHEEL FOR A WHEELCHAIR

(76) Inventor: Brian Gagnon, 4311 NW. 64th Ave., Coral Springs, FL (US) 33067

(*) Notice: Subject to any disclaimer, the term of this patent is extended or adjusted under 35 U.S.C. 154(b) by 0 days.

(21) Appl. No.: 09/311,543

(22) Filed: May 13, 1999

(51) Int. Cl.[7] ....................................................... B60B 5/02
(52) U.S. Cl. ........................ 301/64.7; 301/40.1; 301/104; 280/250.1; 440/90
(58) Field of Search ................................... 440/12.68, 12, 440/26, 90, 100; 280/250.1, 304.1; 301/40.1, 40.2, 64.7, 104

(56) References Cited

U.S. PATENT DOCUMENTS

| | | | |
|---|---|---|---|
| 1,278,624 | * 9/1918 | Foley | 301/40.2 |
| 3,234,989 | * 2/1966 | Ruf | 301/40.1 X |
| 3,952,786 | * 4/1976 | Kreling et al. | 301/64.7 X |
| 4,273,544 | * 6/1981 | Smith | 440/100 X |
| 4,770,432 | * 9/1988 | Wagner | 280/250.1 |
| 4,926,777 | * 5/1990 | Davis, Jr. | 440/100 X |
| 5,028,065 | * 7/1991 | Danecker | 280/250.1 |
| 5,071,378 | * 12/1991 | Wang | 440/90 |
| 5,101,536 | * 4/1992 | Gabriele | 280/250.1 X |
| 5,261,684 | * 11/1993 | Soto | 280/250.1 |
| 5,401,045 | * 3/1995 | Foerster et al. | 280/250.1 |
| 5,427,398 | * 6/1995 | Weybrecht | 301/40.1 X |
| 5,944,390 | * 8/1999 | Parenzuela | 301/104 X |

* cited by examiner

Primary Examiner—Russell D. Stormer
(74) Attorney, Agent, or Firm—Robert M. Downey P.A.

(57) ABSTRACT

An all terrain wheel for a wheelchair includes an integral wheel body having an annular rim, a central hub, and an array of struts extending radially between the hub and the rim. An outer face of the rim includes a circumferential groove sized and configured for fitted receipt of an inflatable inner tube and tire assembly on the rim. The outer face extends axially on opposite sides of the groove to outboard and inboard circumferential edges, forming an outboard rim portion with an integral handrail and an inboard rim portion, thereby providing an enlarged ground engaging surface which discourages sinking of the wheel into sand, mud, snow, grass and like soft terrain. Transverse ribs on the outer rim face provide traction as well as a thumb grip when manually propelling the wheel. A flat face of the struts is disposed generally transverse to the plane of the wheel so that the struts function as paddles for providing propulsion in water as the wheel is rotated.

13 Claims, 4 Drawing Sheets

ALL TERRAIN WHEEL FOR A WHEELCHAIR

BACKGROUND OF THE INVENTION

In the past, there have been many types of wheels and tires proposed for a wide variety of purposes. And, accordingly, it is suffice to state that the wheel art, in general, is a crowded one. Notwithstanding, there has been little development in the more specific field relating to wheels for wheelchairs. In fact, the wheels that are found on present day newly manufactured wheelchairs are essentially identical to wheelchair wheels manufactured over the past several decades. There has been some development in the field of specialty wheels for wheelchairs, particularly for use in various sporting activities. For instance, there are various wheelchair wheels which are particularly designed for sports such as wheelchair basketball and road racing (e.g., wheelchair marathons).

Others in the art have proposed oversized wheels for use on sand, grass and like terrain. While some of these all terrain type wheels have been found to be generally effective in traversing softer ground surfaces, when installed on a wheelchair, they usually enlarge the overall wheelchair size to the extent that it does not conform to the internationally recognized wheelchair dimensions which are often applied to the construction of wheelchair facilities such as ramps, access ways, lifts, and the like. For this reason, wheelchairs fitted with the various all terrain wheels known in the art are often unable to use public wheelchair facilities due to their enlarged size.

SUMMARY OF THE INVENTION

The present invention is directed to an all terrain wheel for a wheelchair and includes an integral wheel body having an annular rim, a central rub, and an array of struts extending radially between the hub and the rim. An outer face of the rim includes a circumferential groove which is sized and configured for removable, fitted receipt of an inflatable inner tube and tire assembly thereto. The outer face of the rim extends axially on opposite sides of the groove, terminating at outboard and inboard circumferential edges, thereby forming an outboard rim portion and an inboard rim portion on opposite respective sides of a tire fitted to the rim. The outboard rim portion includes an integral hand rail formed adjacent the outboard circumferential edge. The outboard and inboard rim portions enlarge the ground engaging surface of the rim, thereby enhancing the wheel's ability to traverse soft terrains by discouraging sinking of the wheel into sand, mud, snow, soft grass and the like. Transverse ribs on the outer rim face provide traction as well as a thumb grip when manually propelling the wheel.

A substantially flat face of the struts in disposed generally transverse to the plane of the wheel to define a paddle wheel type structure. Thus, the struts function as paddles for providing propulsion in water as the wheel is rotated.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
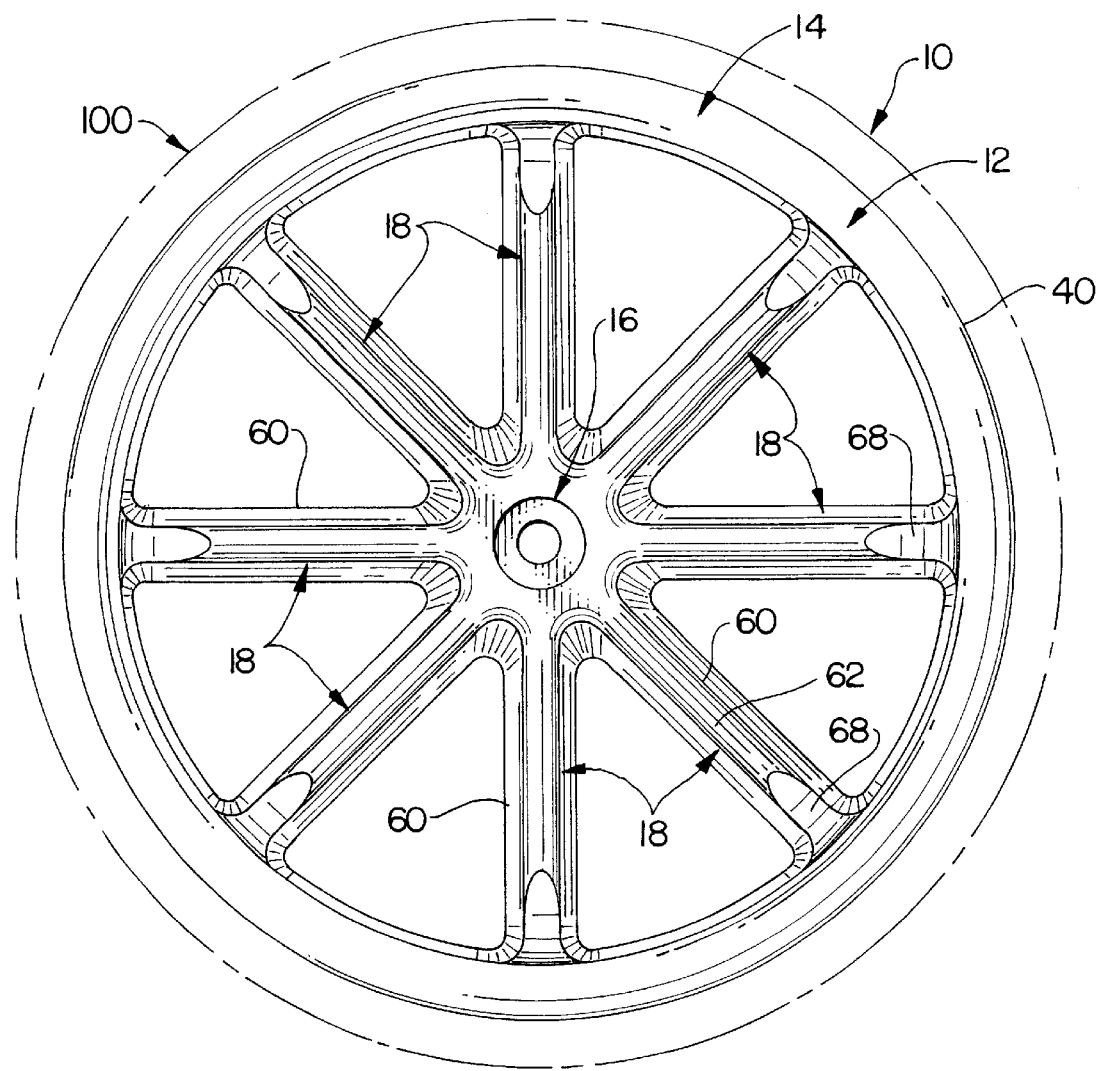
FIG. 1 is a front elevational view of the all terrain wheel of the present invention.

Referring to the several views of the drawings, the all terrain wheel is shown and generally indicated as 10. The all terrain wheel 10 includes an integral wheel body 12 having an annular rim 14, a central hub 16, and an array of struts 18 extending between the hub 16 and the rim 14. An outer face 20 of the rim includes a circumferential groove 22 sized and configured for fitted receipt of an inflatable inner tube and tire assembly 100 on the rim. On each side of the tire, the outer face of the rim extends axially towards outboard and inboard circumferential edges 30, 32, respectively, thereby defining an outboard rim portion 36 and an inboard rim portion 38. The outboard and inboard rim portions 36, 38 create an enlarged ground engaging area to enhance the wheel's ability to traverse soft terrain, such as sand, dirt, snow, mud, grass and the like.

Formed about the outboard edge is an integral hand rail 40 for grasping in order to rotate and manually propel the wheel when fitted to a wheelchair 110 or like vehicle. In a preferred embodiment, the outboard rim portion 36 is approximately equal to the width of the tire 100, which is the primary ground engaging surface when traversing rigid terrain such as cement, concrete, and hard surfaces. The width of the outboard rim portion is sufficient to allow the user to grab the rim 40 with the entire hand, thereby providing better control and enabling the user to apply sufficient force for propulsion of the wheelchair. The inboard rim portion 38 is at least 50% of the width of the tire, providing further ground engaging area to the rim.

Figure 2:
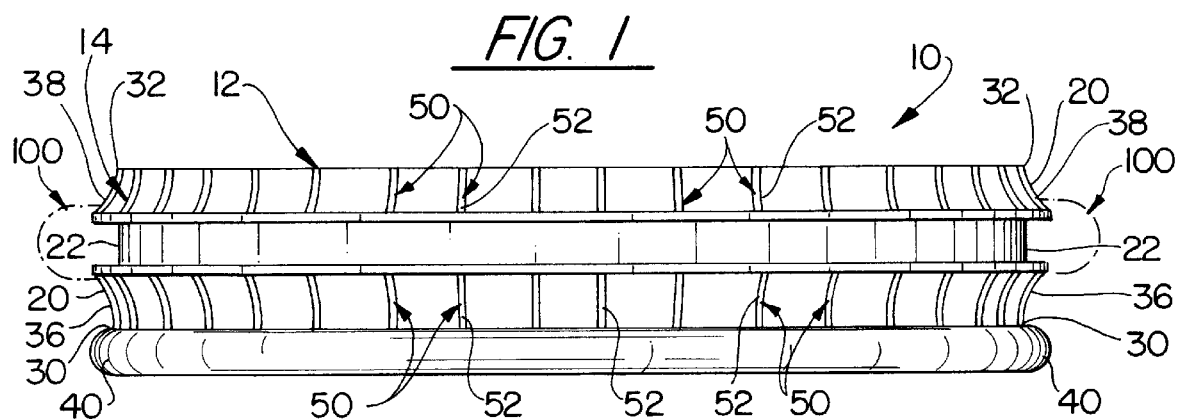
FIG. 2 is a top plan view of the all terrain wheel.
Figure 3:
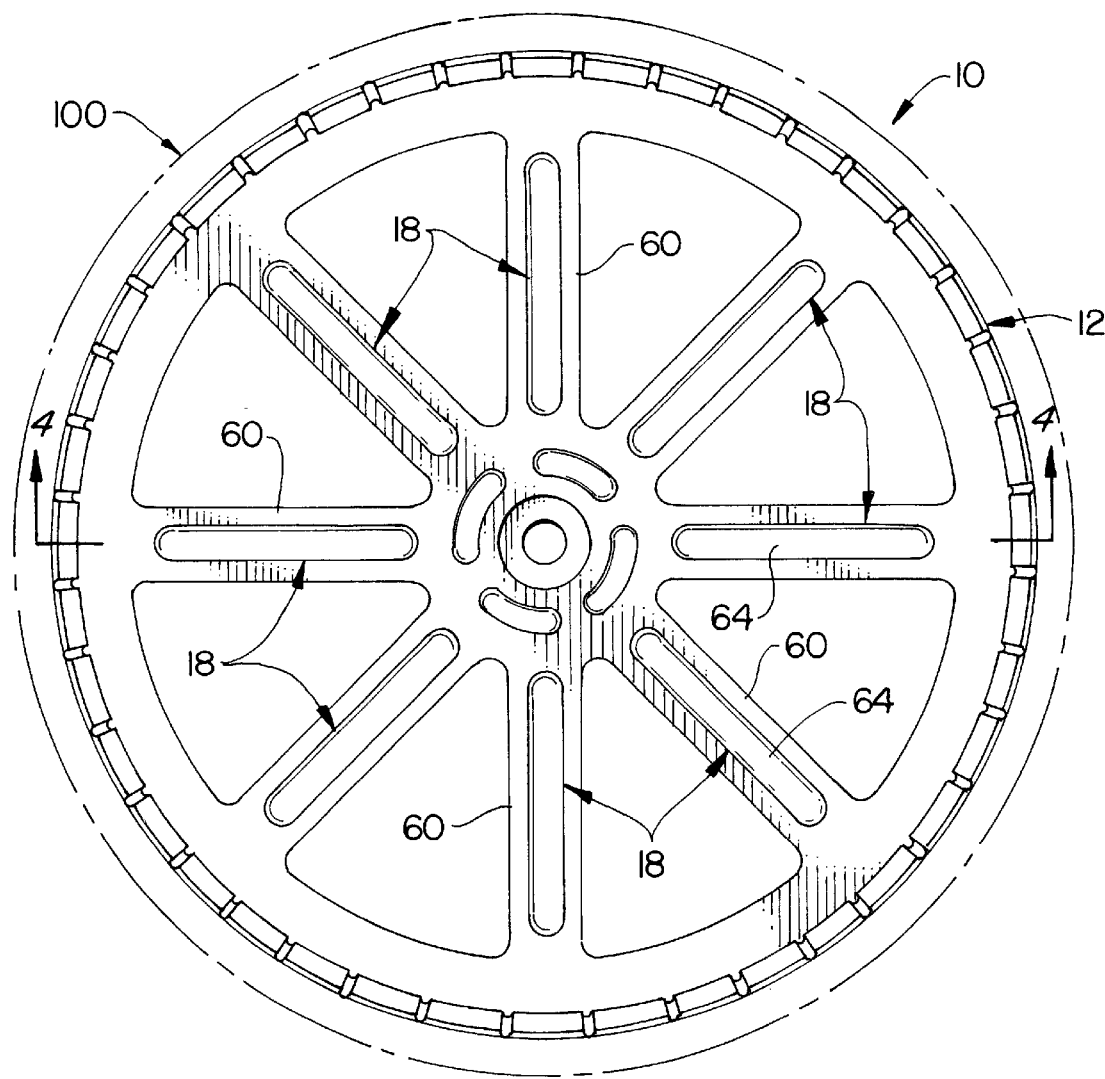
FIG. 3 is a rear elevational view of the all terrain wheel, wherein a tire is indicated by phantom lines in FIGS. 1–3.
Figure 4:
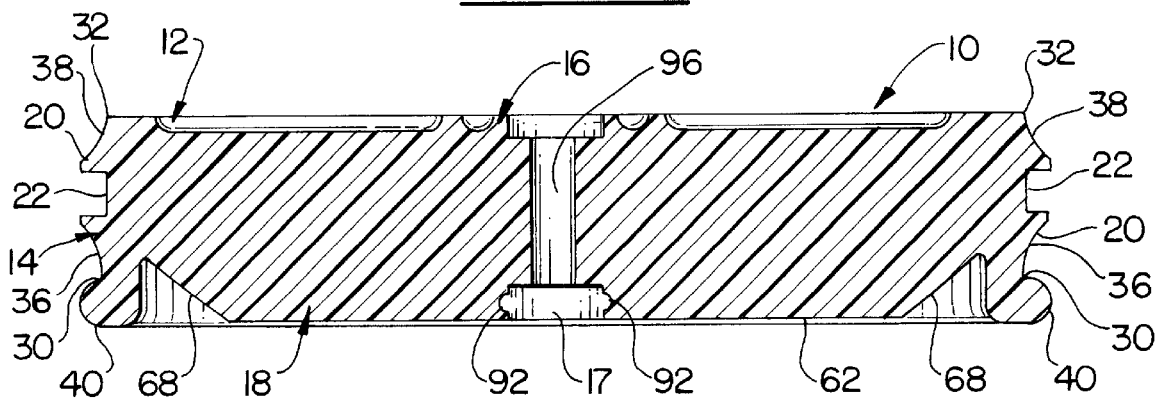
FIG. 4 is a sectional view taken along the plane of the line 4—4 of FIG. 3.
Figure 5:
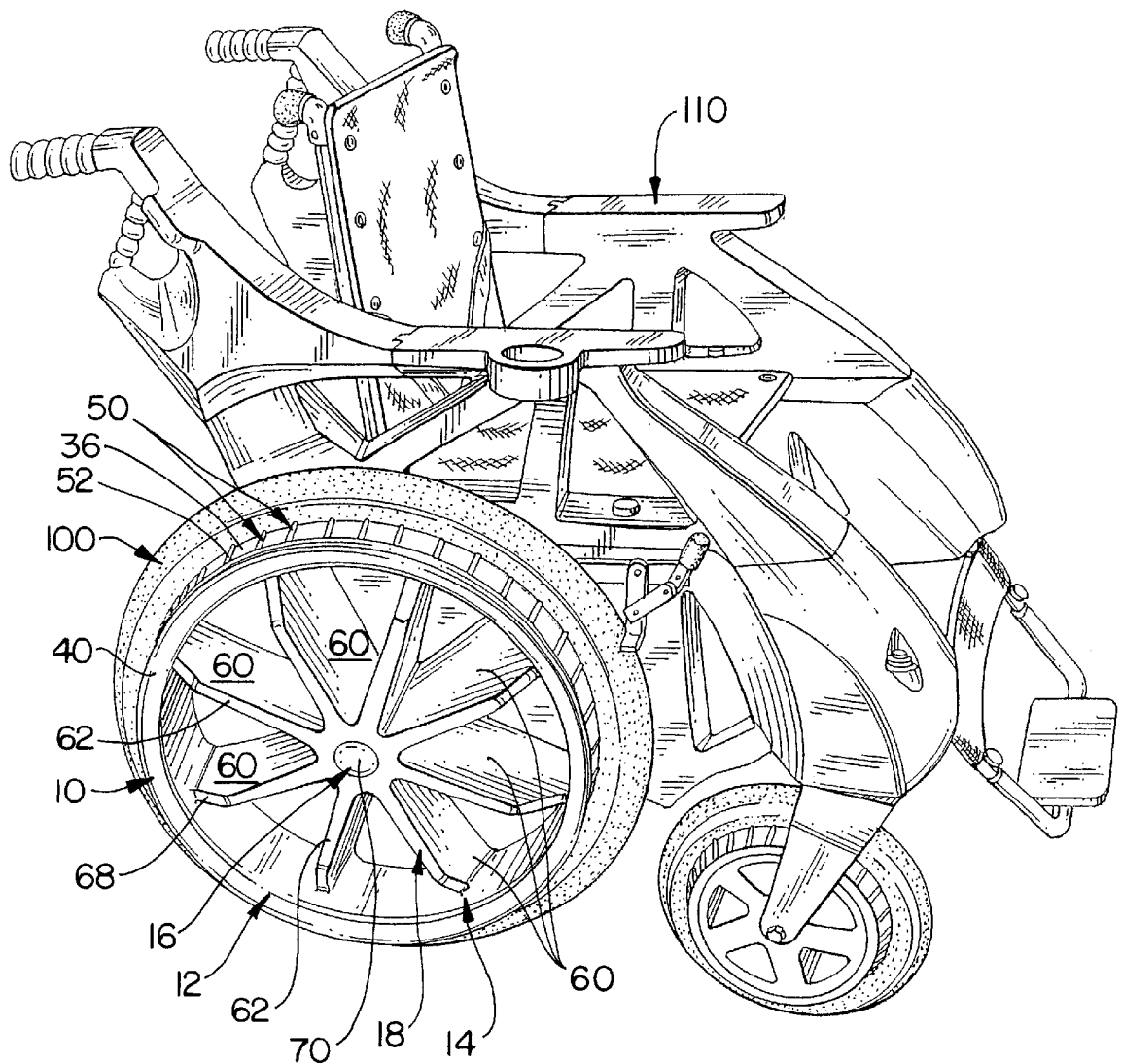
FIG. 5 is a perspective view showing the all terrain wheel fitted to a wheelchair in accordance with a preferred embodiment of the invention.
Figure 6:
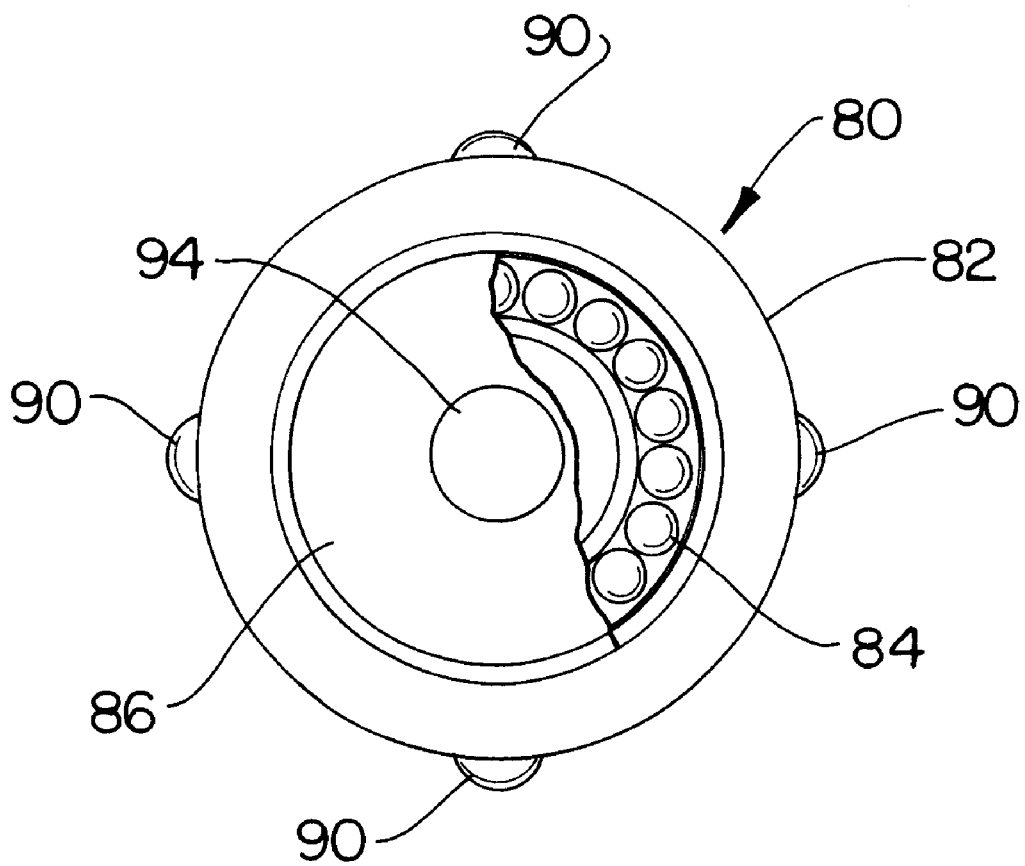
FIG. 6 is an end view, in partial cutaway, showing a locking race bearing system used in conjunction with the wheel.

Traction means 50 are provided, including transverse ribs 52 extending between the tire and the respective outboard and inboard circumferential edges on the outer face of the rim, as best seen in FIG. 2. The transverse ribs serve as a grip means, accommodating the thumb between the ribs, while the other fingers are wrapped about the hand rail, to apply a rotational force thereto in order to rotate the wheel. The transverse ribs further improve traction while traversing across soft terrain.

The struts 18 extending from the hub to the rim are structured and configured to include an enlarged surface area 60 on each of the opposite faces, defining a paddle surface, which is generally transverse to the plane of the wheel, thereby forming a paddle-like structure for use as a propulsion means when the wheel is rotated in water. The outer edge 62 of each strut 18 is narrower than the inner edge 64 causing the paddle surfaces 60 to be angled in a manner which deflects water away from the wheelchair as the wheel is rotated in the water. The struts are further provided with a notched area 68 adjacent the rim to provide clearance for one's hand while grasping the hand rail to rotate the wheel. Each strut is generally rectangular in shape, except that the outer corner of the upper portion of each strut is absent, leaving an angled portion of approximately 45° C. extending inwardly from the outer edge, and defining the notched area 68. The angle on the outer edge 62 of each strut is spaced approximately 2 inches from the outboard face 30 of the rim. It is preferred that the corners and edges of the struts be rounded to provide a smooth contour.

The hub 16 includes a cavity 17 which may be fitted with a locking race bearing system 80 having an outer race 82 surrounding stainless steel ball bearings encapsulated within a bearing case 84. A bushing 86 is fitted to the bearing case and rotates with an inner sleeve of the bearing case. In the preferred embodiment, the race, bearing case and bushing are formed of DELRIN in order to prevent corrosion and eliminate the need for lubricants such as grease or oil, thereby providing a generally maintenance free bearing system. The inner diameter of the hub cavity 17 is sized and configured for snug fit of the bearing system therein. In one embodiment, the outer circumferential surface of the bearing race may include locking bumps 90 which become releasably captured within congruently shaped receptacles 92 formed in the inner surrounding surface of the hub cavity, thereby providing a snap-fit of the bearing system within the wheel hub. The locking bumps 90 also help to prevent slipping or rotation of the bearing race (i.e., locking race) relative to the wheel hub. A central hole 94 in the bushing axially aligns a bore 96 extending through the hub. The wheelchair axle extends through the bore 96 and is sized for fitted, attached receipt, at an end thereof, within the central hole 94 of the bushing. Various axle sizes may be fitted to the hub by merely changing the bushing size.

The wheel bearing case is designed to allow for an easy release hub cap 70 to cover the bearings, while facilitating access to the bearing area for tightening, fresh water rinsing and cleaning, and to inspect and repair the bearing assembly. The inner surface of the hub may include notches to fix the bearing housing relative to the hub, thereby eliminating the need for a metal race area which serves to decrease wear of the bearing housing.

While the instant invention has been shown and described in connection with preferred and practical embodiments thereof, it is recognized that departures may be made from the instant disclosure which, therefore, should not be limited except as defined in the following claims as interpreted under the doctrine of equivalents.

Now that the invention has been described,

What is claimed is:

1. A wheel for a wheelchair comprising:
   an integral wheel body including:
      an annular rim having an outer circumferential face and an annular handrail;
      a central hub; and
      a plurality of struts extending radially between said central hub and said annular rim and each of said plurality of struts including opposite paddle faces, said opposite paddle faces being angled relative to a plane of said wheel for moving water outboard of said wheel and the wheelchair when said wheel is rotated in water to thereby generate a force of propulsion in order to move the wheelchair in the water.

2. The wheel as recited in claim 1 wherein said annular rim includes tire mounting means for fitted attachment of a tire thereabout so that said tire is spaced inboard of said annular handrail.

3. The wheel as recited in claim 2 wherein said outer circumferential face of said annular rim includes inboard and outboard rim portions disposed on opposite sides of said tire, respectively, said inboard and outboard rim portions defining ground engaging surfaces.

4. The wheel as recited in claim 3 wherein said tire mounting means includes a circumferential groove formed in said outer circumferential face between said inboard and outboard rim portions, said circumferential groove being structured and disposed for fitted receipt and mounting of an inflatable inner tube and tire on said annular rim.

5. The wheel as recited in claim 3 wherein said inboard and outboard rim portions include means for providing traction when engaging a ground material.

6. The wheel as recited in claim 3 wherein said outboard rim portion includes grip means thereon for gripping said annular rim while manually rotating said wheel.

7. The wheel as recited in claim 1 wherein said central hub includes means for fitted receipt of an axle bearing system therein.

8. The wheel as recited in claim 1 wherein said plurality of struts each include a notched portion to provide clearance when grasping said annular handrail.

9. A wheel for a wheelchair comprising:
   an integral wheel body including an annular rim, a central hub, and a plurality of struts extending radially between said central hub and said annular rim;
   mounting means on said annular rim for fitted attachment to a tire thereabout;
   said annular rim including an outer circumferential face having an inboard rim portion and an outboard rim portion, said inboard and outboard rim portions being disposed on opposite sides of said tire mounting means, respectively, and said inboard and outboard rim portions defining ground engaging surfaces;
   an annular handrail integral with said annular rim and disposed adjacent to said outboard rim portion in spaced relation to said tire mounting means; and
   each of said plurality of struts including opposite paddle faces which are angled relative to a Plane of said wheel for moving water outboard of said wheel and the wheelchair when said wheel is rotated in water to thereby generate a force of propulsion in order to move the wheelchair in the water.

10. The wheel as recited in claim 9 wherein said tire mounting means includes a circumferential groove formed in said outer circumferential face between said inboard and outboard rim portions, said circumferential groove being structured and disposed for fitted receipt and mounting of an inflatable inner tube and a tire on said annular rim.

11. The wheel as recited in claim 9 wherein said inboard and outboard rim portions each include means for providing traction when engaging a ground material.

12. The wheel as recited in claim 9 wherein said outboard rim portion includes grip means thereon for gripping said annular rim while manually rotating said wheel.

13. The wheel as recited in claim 9 wherein said central hub includes means for fitted receipt of an axle bearing system therein to facilitate rotational attachment of said wheel to an axle of the wheelchair.

* * * * *